(12) United States Patent
Irwin et al.

(10) Patent No.: US 6,402,655 B1
(45) Date of Patent: Jun. 11, 2002

(54) LIMITED SLIP DIFFERENTIAL WITH ADJUSTABLE PRELOAD

(75) Inventors: Earl James Irwin, Fort Wayne; David Joseph Young, Kimmell, both of IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/608,143

(22) Filed: Jun. 30, 2000

(51) Int. Cl.[7] ............................................. F16H 48/06
(52) U.S. Cl. ...................................................... 475/231
(58) Field of Search ................................ 475/231, 233, 475/240, 346; 464/45

(56) References Cited

U.S. PATENT DOCUMENTS

| | | | |
|---|---|---|---|
| 1,979,414 A | | 11/1934 | Smith |
| 2,133,112 A | * | 10/1938 | Ormsby ...................... 384/583 |
| 2,354,214 A | | 7/1944 | Lockwood |
| 3,403,582 A | | 10/1968 | Morden |
| 3,543,968 A | * | 12/1970 | Altmann ..................... 475/240 |
| 4,305,313 A | | 12/1981 | Konkle |
| 4,594,913 A | | 6/1986 | Opitz |
| 4,598,609 A | * | 7/1986 | Nellums et al. .............. 74/650 |
| 4,679,463 A | * | 7/1987 | Ozaki et al. ............ 475/231 X |
| 4,781,079 A | | 11/1988 | Takahashi |
| 4,914,800 A | * | 4/1990 | Cook ...................... 475/246 X |
| 5,045,038 A | | 9/1991 | Sherlock |
| 5,092,825 A | * | 3/1992 | Goscenski, Jr. et al. 475/231 X |
| 5,741,199 A | | 4/1998 | Tanser et al. |
| 6,168,545 B1 | * | 1/2001 | Lowell ........................ 475/231 |
| 6,227,716 B1 | * | 5/2001 | Irwin .......................... 384/583 |
| 6,283,889 B1 | * | 9/2001 | Bordner ...................... 475/231 |

* cited by examiner

*Primary Examiner*—Charles A Marmor
*Assistant Examiner*—Roger Pang
(74) *Attorney, Agent, or Firm*—Liniak, Berenato, Longacre & White

(57) ABSTRACT

A differential assembly having a limited slip device with a mechanism to adjust the preload of a clutch pack. The differential assembly includes a differential case with pinion and side gears disposed therein. The clutch pack is disposed between at least one of the side gears and the differential case to retard relative rotation there between. An adjustment collar is disposed between the clutch pack and the differential case to adjust the preload of the clutch pack. Elongated slots are formed through the differential case to provide external access to spanner slots formed in the adjustment collar. A tool may be inserted through the elongated slots to engage the spanner slots and selectively rotate the adjustment collar to adjust the preload.

7 Claims, 4 Drawing Sheets

LIMITED SLIP DIFFERENTIAL WITH ADJUSTABLE PRELOAD

FIELD OF THE INVENTION

The present invention relates to a differential assembly and more particularly to a differential assembly having a limited slip device with adjustable pre-load.

DESCRIPTION OF THE PRIOR ART

Differential assemblies having a limited slip device are known in the art. FIG. 1 depicts a differential assembly having a limited slip device according to the prior art. Differential pinions 5 and side gears 7 are disposed within a differential case 6. A multiple-disc clutch pack 4 is disposed between one or each of the side gears 7 and the differential case 6. The differential case 6 may have axial grooves or splines to prevent rotation and allow axial displacement of friction discs of the clutch pack 4. Similarly clutch plates are splined onto the side gears 7 and interposed between the friction discs. A spring is normally disposed between the side gears 7 to urge the side gears 7 apart and cause frictional engagement in the clutch pack. However, a Belleville spring 8 may be disposed between the clutch pack 4 and either the side gear 7 or differential case 6. The friction between the friction discs and clutch plates limits the amount that the side gears 5 may slip relative to the differential case 6. However, the prior art assemblies do not facilitate selective adjustment of the clutch pack 4 preload. Moreover, the prior art fails to provide a means to adjust the clutch pack 4 preload after the differential is assembled and provide easy readjustment after a portion of its service life has expired or the ability to easily externally adjust the clutch pack 4 preload from the differential case 6.

SUMMARY OF THE INVENTION

The present invention is directed to a differential assembly having a limited slip device with adjustable preload. The differential assembly includes a differential case with pinion and side gears disposed therein. The clutch pack is disposed between at least one of the side gears and the differential case to retard relative rotation there between. An adjustment collar is disposed between the clutch pack and the differential case to adjust the preload of the clutch pack. Elongated slots are formed through the differential case to provide external access to spanner slots formed in the adjustment collar. A tool may be inserted through the elongated slots to engage the spanner slots and selectively rotate the adjustment collar to adjust the pre-load of the clutch pack. The arrangement of the present invention provides the ability to uniformly adjust the pre-load of the clutch pack with access external of the differential case.

DETAILED DESCRIPTION OF THE PREFERRED EMBODIMENT

Figure 1:
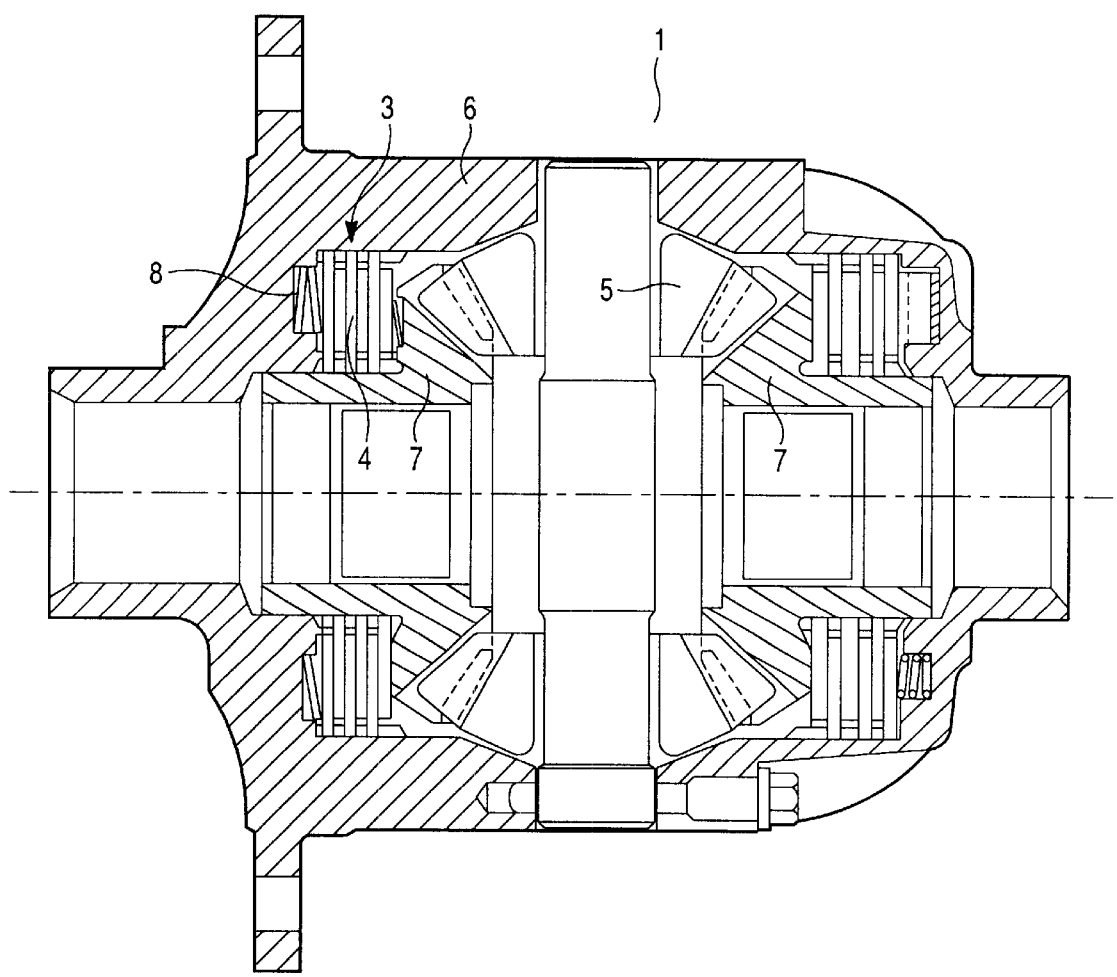
FIG. 1 is a sectional view of a differential axle assembly having a limited slip device according to the prior art.
Figure 2:
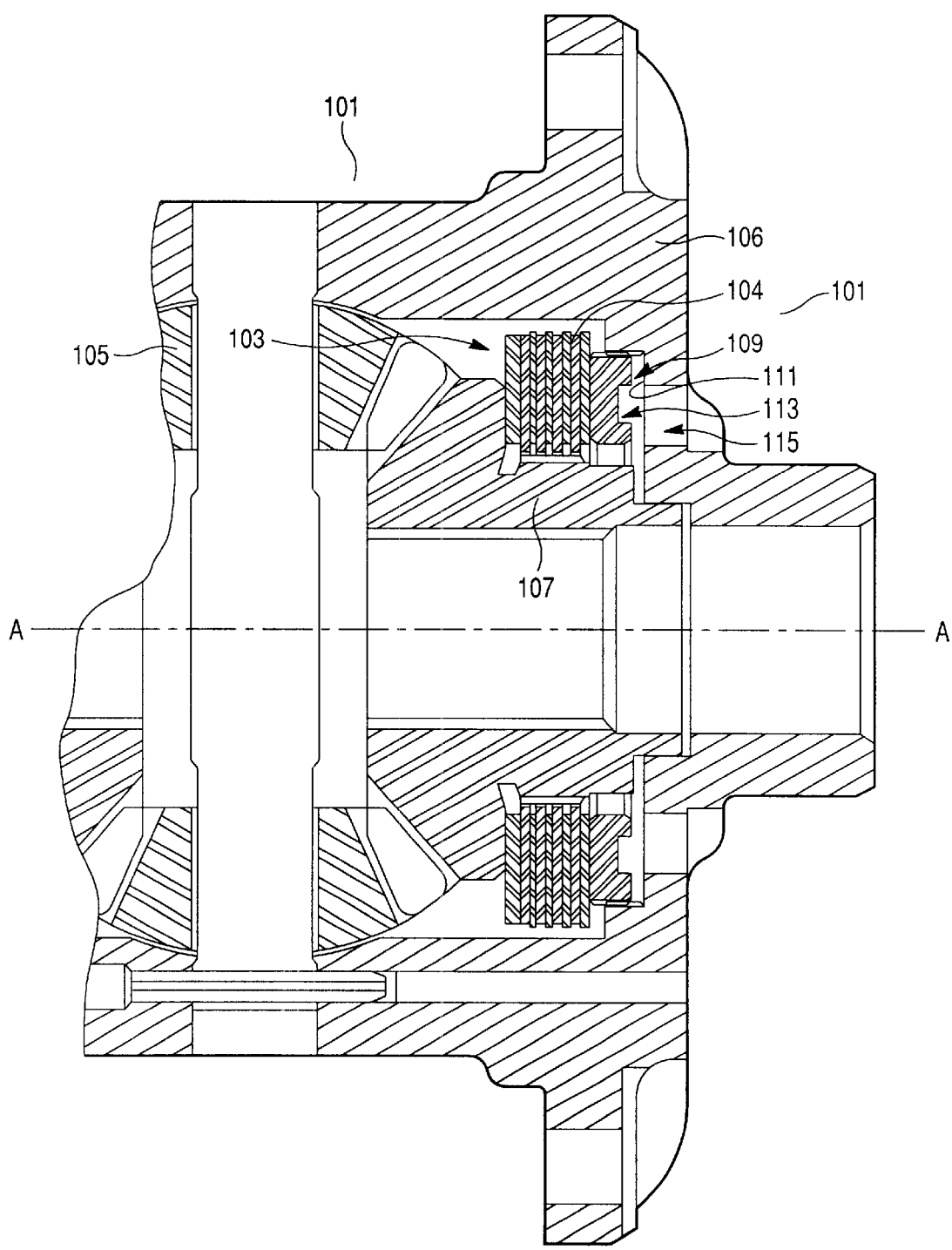
FIG. 2 is a partial sectional view of a differential axle assembly according to the present invention.

The present invention provides the ability to adjust the preload of the limited slip device. FIG. 2 depicts a differential assembly 101 having a limited slip device 103 according to the present invention. Differential pinions 105 and side gears 107 are disposed within a differential case 106. A multiple-disc clutch pack 104 is disposed between one or each of the side gears 107 and the differential case 106 (one shown). The differential case 106 may have axial grooves or splines to prevent rotation and allow axial displacement of friction discs of the clutch pack 104. An adjustment collar 109 is disposed between the limited slip device 103 and the differential case 106. The adjustment collar 109 threadingly engages an annular recess 111 formed in said differential case. Simply rotating the adjustment collar 109 adjusts the preload of the clutch pack 104 of the limited slip device 103.

Figure 3:
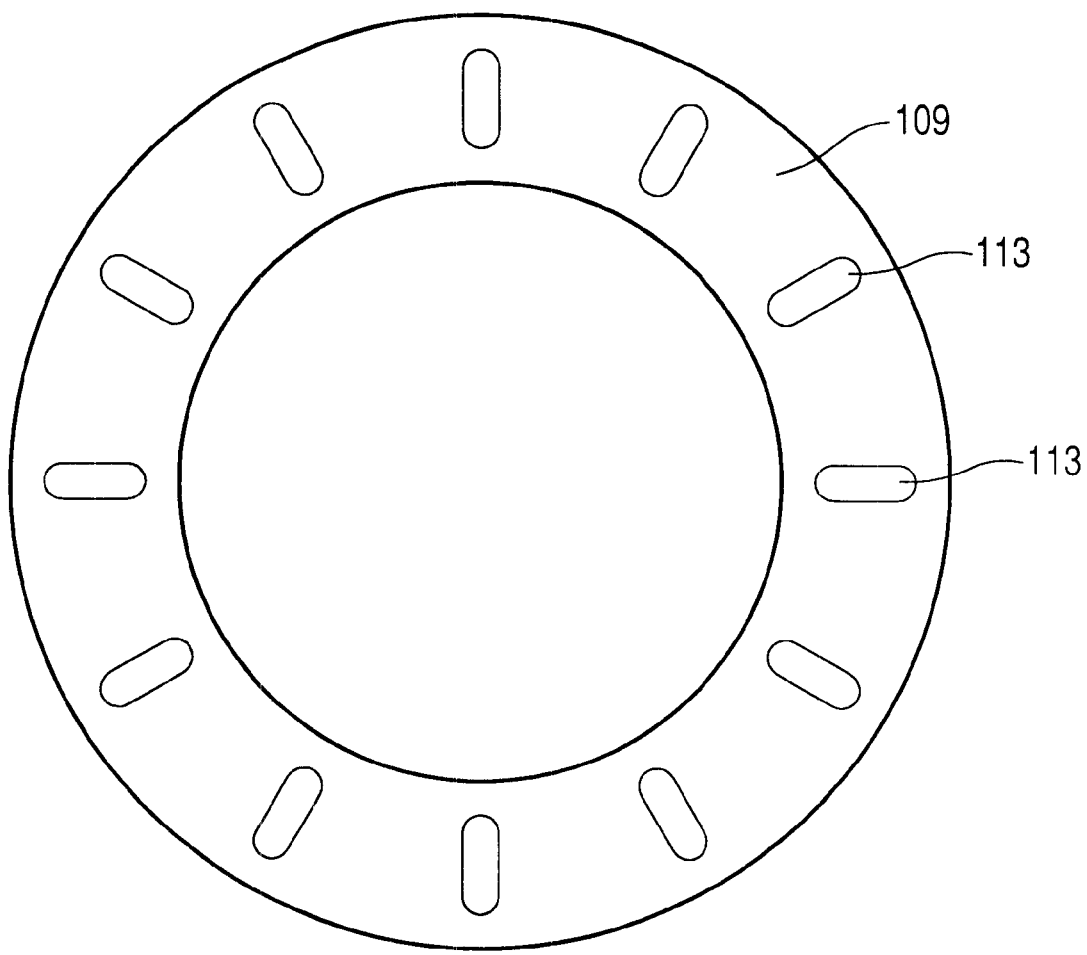
FIG. 3 is side view of the adjustment collar of FIG. 1 according to the present invention.
Figure 4:
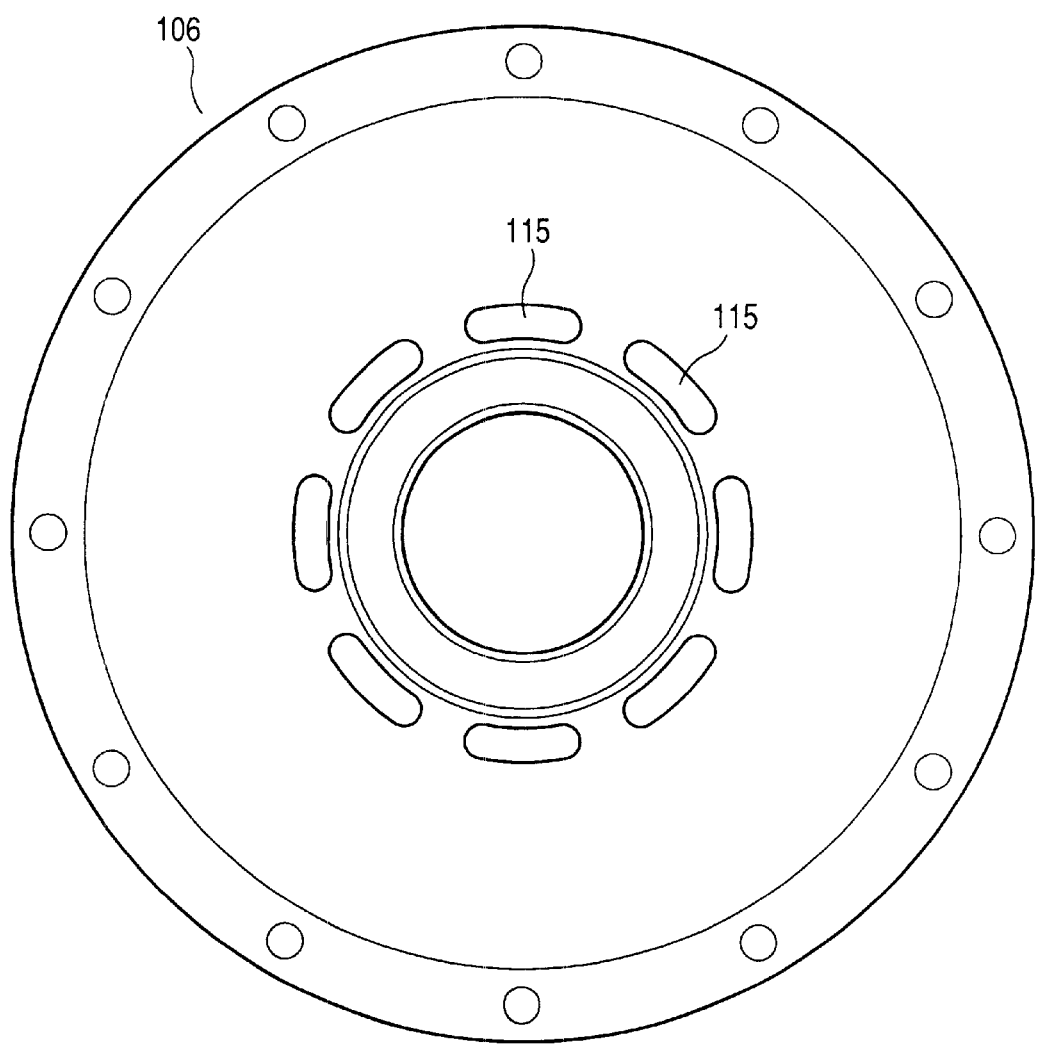
FIG. 4 is side view of the differential case of FIG. 1 according to the present invention.

The differential gear assembly is mounted within a housing to rotate about an axis of rotation A-A. The side gears 107 are rotatably mounted within the differential case 105 also rotatably about axis A-A. Referring to FIG. 3, the adjustment collar 109 is formed of an annular member and circumscribes axis A-A. Rotation of the adjustment collar causes the adjustment collar 109 to translate along axis A-A. The axial position of the adjustment collar 109 will determined the preload of the clutch pack 104 and limited slip. Therefore, by simply turning the adjustment collar 109, the preload may be adjusted.

In order to facilitate the rotation of the adjustment collar, a plurality of spanner slots 113 are formed on an outside face of the adjustment collar. To facilitate access to the spanner slots 113, a plurality of elongated arcuate slots 115 are formed through the differential case 106 adjacent the adjustment collar 109. The number of spanner slots 113 and elongated arcuate slots 115 are not critical to the operation of the present invention so long as a tool may be inserted through the elongated arcuate slots 115 to engage a plurality of the spanner slots and permit rotation of the adjustment collar 109.

Preferably a hand or other tool having a plurality of prongs are inserted through the elongated arcuate slots 115 and engage spanner slots 113. By simply rotating the tool, the adjustment collar is rotated and the preload adjusted. To obtain the desired preload, the tool may be used incrementally whereby the tool engages a first set of spanner slots is retracted and backed off and engages a second set of spanner slots for further rotation until the desired position of the adjustment collar is achieved and the desired preload is obtained.

The differential case 106 is made of material commonly used to form differential cases such as steel. The adjustment collar is also preferably made of the same material as the differential case. However, other materials of sufficient strength may be employed.

While the foregoing invention has been shown and described with reference to a preferred embodiment, it will be understood by those possessing skill in the art that various changes and modifications may be made without departing from the spirit and scope of the invention

What is claimed is:

1. A differential axle assembly comprising:

a differential case having an axis of rotation;

a pair of side gears rotatably mounted within said differential case about said axis of rotation;

a limited slip device disposed between at least one of said side gears and said differential case;

an adjustment collar adjustably secured to said differential case and disposed between said at least one limited slip device and said differential case provided to adjust a preload of said limited slip device.

2. A differential axle assembly comprising:

a differential case having an axis of rotation;

a pair of side gears rotatably mounted within said differential case about said axis of rotation;

a limited slip device disposed between at least one of said side gears and said differential case;

an adjustment collar disposed between said at least one limited slip device and said differential case provided to adjust a preload of said limited slip device;

wherein said adjustment collar is an annular member circumscribing said axis of rotation and threadingly engages an annular recess formed in said differential case annular formed said differential case.

3. The differential axle assembly according to claim 2, wherein said adjustment collar has a plurality of spanner slots formed on an outer surface thereof, and said differential case has a plurality of elongated arcuate slots circumscribing said axis of rotation and disposed adjacent said adjustment collar to provide external access to said spanner slots to facilitate the use of a tool to engage said spanner slots and selectively rotate said adjustment collar.

4. The differential axle assembly according to claim 2 wherein said assembly comprises two limited slip devices one each disposed between a corresponding one of said side gears and said differential case and two adjustment collars one each disposed between a corresponding one of said limited slip devices and said differential case.

5. The differential gear assembly according to claim 1, wherein said limited slip device comprises a clutch pack having a plurality of friction discs non-rotatably secured to said differential case and a plurality of clutch plates each splined to said one side gear and disposed between a pair of said friction discs.

6. A method of adjusting the differential axle assembly of claim 2 by adjusting the pre-load of said limited slip device, said method including the step of:

rotating said adjustment collar to thereby cause said adjustment collar to translate along said axis of rotation and adjust the pre-load of said limited slip device.

7. A differential axle assembly comprising a differential case;

a gear assembly rotatably disposed within said differential case to provide differential torque transfer, said gear assembly including a pair of side gears mounted rotatably about said axis of rotation;

a clutch pack disposed between one of said side gears and said differential case;

an adjustment collar adjustably secured to said differential case and disposed between one of said side gears and said differential case.

* * * * *